Patented Mar. 22, 1932

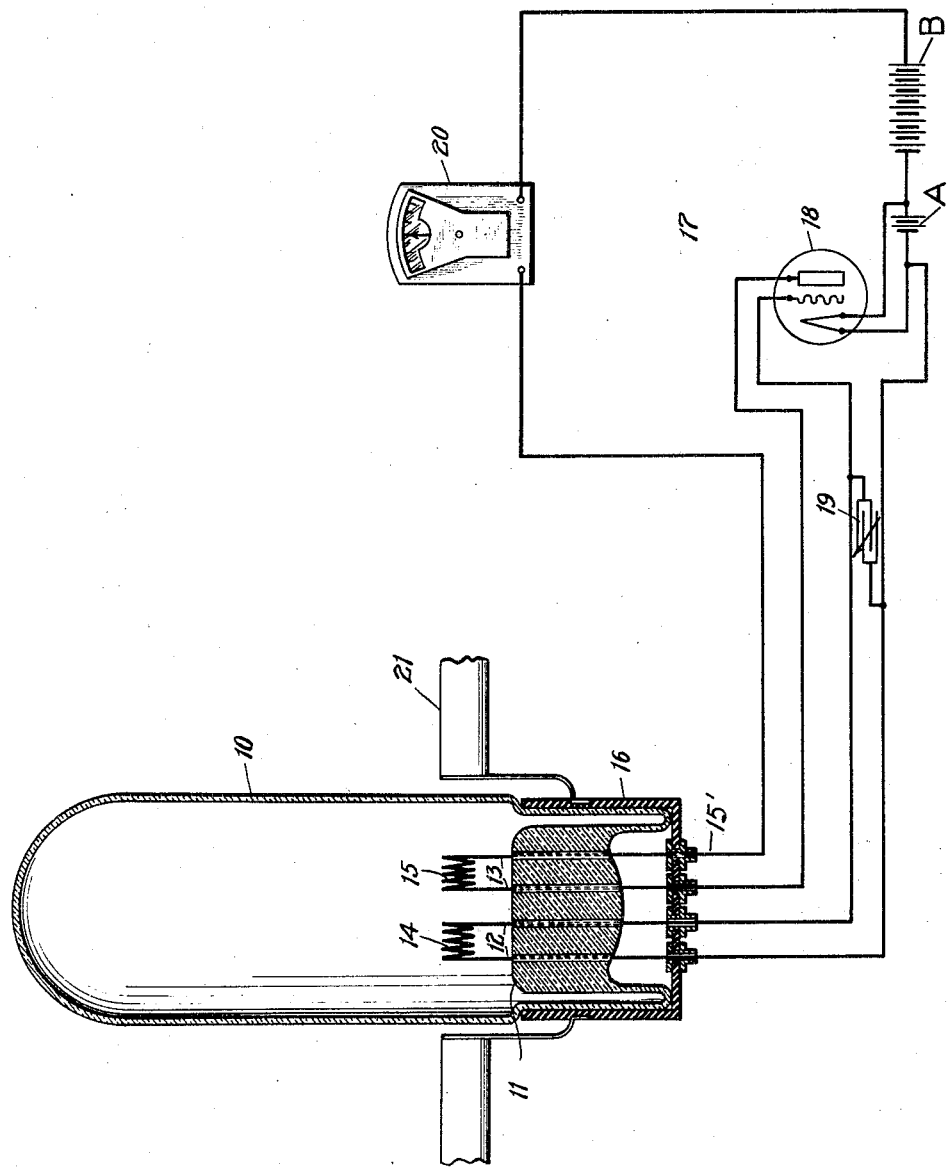

1,850,774

UNITED STATES PATENT OFFICE

PAUL SCHWERIN, OF RUTHERFORD, NEW JERSEY, ASSIGNOR TO PERRYMAN ELECTRIC CO. INC., OF NORTH BERGEN, NEW JERSEY, A CORPORATION OF DELAWARE

DIRECTION FINDER

Application filed November 2, 1929. Serial No. 404,466.

This invention relates to direction finders for aircraft, ships or other vehicles and has for an object a direction finder which is simple in construction, effective in operation and contains no moving parts.

A direction finder embodying this invention comprises a vacuum tube oscillator having co-acting induction coils in its input and output circuits in combination with means for concentrating lines of force from the earth's magnetic field and producing a magnetic field substantially coaxial with said coils. The coils are mounted on an aircraft or the like in fixed relationship to the longitudinal axis thereof and preferably have their axes parallel to the craft's axis. In the output circuit of the oscillator there is provided a meter which indicates changes in current flow in such circuit. The current flow in the output circuit will be varied by changes in the strength of the magnetic field applied to the current, the field in turn being varied with changes in direction of the axis of the craft. By reading the meter the deviation of the craft's axis from the direction of the earth's magnetic field may be determined and the angularity of the path of travel of the craft relatively to the earth's magnetic field be thereby established.

Other objects, novel features and advantages of this invention will be apparent from the following description and accompanying drawing, wherein: the single figure discloses partly in section and partially diagrammatic an embodiment of the invention.

In the drawing a glass envelope 10 or the like is provided with a re-entrant stem 11 in which are sealed two pairs of leading-in wires 12 and 13. The inner ends of the leading-in wires 12 and 13 support induction coils 14 and 15, while the outer ends are connected to terminals mounted in the base 16 which supports the envelope 10.

A vacuum tube oscillator circuit is shown at 17 and the coils 14 and 15 are so connected with the electrodes of the vacuum tube 18 through the terminals 15' that such coils constitute the feed back for the oscillator circuit. The vacuum electrode 18 is of the standard three-electrode type and electrical energy is supplied thereto in the usual manner from suitable source of electrical energy, such, for example, as the batteries A and B. In the input circuit there is provided the variable condenser 19 usual to such circuit and in the output circuit there is provided a meter 20 which registers the value of the current flowing in such circuit.

The coils 14 and 15 are co-axially arranged and a pair of alined spaced pole pieces 21 are arranged with their axis co-incident with the axis of the coils. These pole pieces are composed of metal which has high magnetic permeability at low flux density and which is devoid of permanent magnetism. These pole pieces are effective to concentrate the lines of force of the earth's magnetic field to produce a strong field passing through the coils 14 and 15. The strength of this field will be dependent upon the position of the pole pieces relative to the earth's magnetic field. The field in the coils 14 and 15 will be maximum when the pole pieces 21 are parallel with the earth's magnetic field and there will be no field when the pole pieces are perpendicular to the earth's magnetic field.

The flow of current in the output circuit of the oscillator will vary in response to the strength of the field produced through the coils 14 and 15 by the pole pieces 21. It is thus possible by observing the meter 20 to determine whether the pole pieces 21 are in alinement with the earth's magnetic field or are transverse thereto. When the vessel 10 is mounted upon an aircraft or other vehicle, the pole pieces 21 are given a definite direction with respect to the longitudinal axis of the craft, preferably parallel thereto. The meter 20 is mounted at any suitable location where it is plainly visible to the pilot and deviation of the craft from the desired course can be readily ascertained by observation of the meter. The oscillator may be adjusted so that an extremely slight variation in the field due to slight variation in direction would cause a spill-over similar to that experienced in radio sets when oscillation starts and squealing begins. The pointer of the meter under such circumstances would jump instantaneously from a low to a high reading and would give a very definite indication of variations in direction.

Although this device has been disclosed primarily for use in connection with the earth's magnetic field, it is well adapted for use in connection with a radio beam. The meter would show one reading when the coils were in alinement with the radio beam and another reading when they were out of alinement with such beam. Deviation from the direction of the radio beam is instantly indicated by the meter and the pilot need only to maintain his direction such that the meter reading remains constant. It will then be flying along the radio beam. Although the coils 14 and 15 are shown as being arranged within a container it is not necessary that they be so enclosed. The container merely protects the coils, but in no way affects the operation of the set. The enclosure for the coils may be dispensed with and the set will function equally well.

It is of course understood that various modifications may be made in the device above described, without in any way departing from the spirit of the invention as defined in the appended claims.

I claim:

1. A direction finder comprising a vacuum tube oscillator having co-acting induction coils in its input and output circuits, and means for concentrating the horizontal components of the lines of force of the earth's magnetic field and directing the same through said coils.

2. A direction finder comprising a vacuum tube oscillator having co-acting induction coils in its input and output circuits, means for concentrating the horizontal components of the lines of force of the earth's magnetic field and directing the same through said coils, and means for indicating variations in the current flow in the output circuit.

3. A direction finder comprising a vacuum tube oscillator having co-acting induction coils in its input and output circuits, and pole pieces substantially co-axial with said induction coils, said pole pieces being composed of a metal having high magnetic permeability at low flux density.

4. A direction finder comprising a vacuum tube oscillator having co-acting induction coils in its input and output circuit, pole pieces substantially co-axial with said induction coils, said pole pieces being composed of a metal having high magnetic permeability at low flux density, and means for indicating variations in the current flow in said output circuit.

5. A direction finder comprising a vacuum tube oscillator having its input and output circuits inductively connected, and means for concentrating the horizontal components of the lines of force of the earth's magnetic field and directing the same through the inductance connection between said input and output circuits.

6. A direction finder comprising a vacuum tube oscillator having its input and output circuits inductively connected, means for concentrating the horizontal components of the lines of force of the earth's magnetic field and directing the same through the inductance connection between said input and output circuits, and means for indicating variations of current flow in the output circuit.

7. A direction finder comprising a three-electrode vacuum tube, an input and an output circuit for said tube, an inductive connection between the input and output circuits, and means for concentrating the horizontal components of the lines of force of the earth's magnetic field and directing the same through said induction connection.

8. A direction finder comprising a three-electrode vacuum tube, an input and an output circuit for said tube, an inductive connection between the input and output circuits, means for concentrating same and directing the same through said induction connection, and means for indicating variations of current flow in said output circuit.

9. A direction finder comprising a vacuum tube oscillator having an inductive connection between its input and output circuits and pole pieces of high magnetic permeability at low flux density operatively related to said inductive connection.

In testimony whereof, I have signed my name to this specification.

PAUL SCHWERIN.